(12) United States Patent
Drane

(10) Patent No.: US 8,273,998 B2
(45) Date of Patent: Sep. 25, 2012

(54) DUAL VOLTAGE ELECTRICAL FLOOR BOX

(75) Inventor: Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 231 days.

(21) Appl. No.: 12/828,414

(22) Filed: Jul. 1, 2010

(65) Prior Publication Data

US 2011/0005799 A1    Jan. 13, 2011

Related U.S. Application Data

(60) Provisional application No. 61/223,879, filed on Jul. 8, 2009.

(51) Int. Cl.
*H02G 3/04* (2006.01)

(52) U.S. Cl. ........ 174/484; 174/482; 174/487; 174/494; 174/58; 52/220.8

(58) Field of Classification Search ............ 174/58, 174/482, 487, 489, 494, 54, 484; 52/220.8
See application file for complete search history.

(56) References Cited

U.S. PATENT DOCUMENTS

| | | |
|---|---|---|
| 3,472,945 A | 10/1969 | Trachtenberg |
| 3,701,837 A | 10/1972 | Fork |
| 4,899,506 A | 2/1990 | Chapman et al. |
| 5,225,214 A | 7/1993 | Filion |
| 5,237,128 A | 8/1993 | Wuertz |
| 5,285,009 A | 2/1994 | Bowman et al. |
| 5,466,886 A | 11/1995 | Lengyel et al. |
| 5,468,908 A | 11/1995 | Arthur et al. |
| 5,486,650 A | 1/1996 | Yetter |
| 5,705,772 A | 1/1998 | Brown |
| 5,783,774 A | 7/1998 | Bowman et al. |
| 6,114,623 A | 9/2000 | Bonilla et al. |
| 6,175,078 B1 | 1/2001 | Bambardekar et al. |
| 6,194,658 B1 | 2/2001 | Duval |

(Continued)

FOREIGN PATENT DOCUMENTS

| | | |
|---|---|---|
| CA | 2725828 | 11/1999 |

(Continued)

OTHER PUBLICATIONS

Thomas & Betts, "Installation Instructions 68P Dual Voltage Kit", Thomas & Betts Corp., 2003, Memphis, Tennessee.

(Continued)

*Primary Examiner* — Dhirubhai R Patel
(74) *Attorney, Agent, or Firm* — Hoffmann & Baron, LLP

(57) ABSTRACT

An outlet box assembly for separating and insulating higher voltage power conductors from lower voltage data conductors. The assembly includes a housing, a housing divider and a bracket. The housing including at least one vertically extending side wall defining an interior space therein. The housing divider disposed within the housing and extending across the interior space forming a vertical barrier between a first housing compartment and a second housing compartment. The bracket capable of having secured thereto at least one of the higher voltage power conductors and at least one of the low voltage data conductors. The bracket including at least one partition separating conductor compartments therein, the at least one partition extending vertically and substantially perpendicular to the divider. A floor of each conductor compartment extends across at least a portion of both the first housing compartment and the second housing compartment.

16 Claims, 8 Drawing Sheets

U.S. PATENT DOCUMENTS

| | | | |
|---|---|---|---|
| 6,218,613 | B1 | 4/2001 | Justiniano et al. |
| 6,274,809 | B1 | 8/2001 | Pudims et al. |
| 6,307,152 | B1 | 10/2001 | Bonilla et al. |
| 6,395,978 | B1 | 5/2002 | Whitehead et al. |
| 6,417,446 | B1 * | 7/2002 | Whitehead ............... 174/484 |
| 6,483,028 | B2 | 11/2002 | DeBartolo, Jr. et al. |
| 6,653,561 | B2 | 11/2003 | Lalancette et al. |
| 6,696,640 | B1 | 2/2004 | Castellani et al. |
| 6,720,495 | B2 | 4/2004 | Castellani et al. |
| 7,053,296 | B2 | 5/2006 | Drane et al. |
| 7,304,235 | B1 | 12/2007 | Gretz |
| 7,348,487 | B2 | 3/2008 | Drane |
| 7,388,164 | B2 | 6/2008 | Scanzillo |
| 7,618,284 | B2 | 11/2009 | Lamoureux et al. |
| 8,063,317 | B2 * | 11/2011 | Bowman ............... 174/483 |
| 2007/0074887 | A1 | 4/2007 | Drane |
| 2009/0014196 | A1 | 1/2009 | Peck |
| 2009/0218128 | A1 | 9/2009 | Carbone et al. |

FOREIGN PATENT DOCUMENTS

| | | |
|---|---|---|
| FR | 2670625 A1 | 6/1992 |

OTHER PUBLICATIONS

Office Action issued Jun. 6, 2011 in Canadian Patent Application No. 2,708,849.

* cited by examiner

DUAL VOLTAGE ELECTRICAL FLOOR BOX

CROSS-REFERENCE TO RELATED APPLICATIONS

This application claims the benefit of U.S. Provisional Patent Application Ser. No. 61/223,879 that was filed on Jul. 8, 2009, the subject matter of which is incorporated herein by reference.

TECHNICAL FIELD

The presently disclosed technologies are directed to electrical floor boxes for dual voltage and particularly floor boxes with multi-gang capacity.

BACKGROUND

Conventional floor boxes are difficult to customize due to electrical codes that generally require boxes that accommodate both higher voltage power and lower voltage data maintain physical separation between the various services. Such floor boxes will generally house multiple gangs of receptacles or controls. Ganging refers to when two or more electrical receptacles or controls are mounted side by side in a series within a single electrical box. Often, a particular installation will require a customized configuration of ganged receptacles or controls, which can make the division of high/low voltage complex to configure.

Accordingly, it would be desirable to provide a customizable and easy to install floor box that can accommodate both higher voltage power and lower voltage data, and other shortcomings of the prior art.

SUMMARY

According to aspects described herein, there is disclosed an outlet box assembly for separating and insulating higher voltage power conductors from lower voltage data conductors. The assembly includes a housing, a housing divider and a bracket. The housing including at least one vertically extending side wall defining an interior space therein. The housing divider disposed within the housing and extending across the interior space forming a vertical barrier between a first housing compartment and a second housing compartment. The bracket capable of having secured thereto at least one of the higher voltage power conductors and at least one of the low voltage data conductors. The bracket including at least one partition separating conductor compartments therein, the at least one partition extending vertically and substantially perpendicular to the divider. A floor of each conductor compartment extends across at least a portion of both the first housing compartment and the second housing compartment.

According to other aspects described herein, the bracket can be substantially disposed vertically above the divider. Also, the housing can include at least one vertical slot, wherein an edge of the housing divider is seated within the slot. The bracket can include an alignment tab disposed in the slot. Each conductor compartment floor can include at least one knock-out, whereby removal of each knock-out forms an aperture between the respective conductor compartment and one of the first housing compartment and the second housing compartment. At least one conductor compartment floor can include at least two knock-outs, wherein removal of each of the two knock-outs forms an aperture between the at least one conductor compartment and a different one of the first housing compartment and the second housing compartment. A receptacle plate can cover at least one portion of the at least one receptacle, the receptacle plate securing the receptacle between the receptacle plate and the bracket. The receptacle plate includes a dividing wall extending from the receptacle plate toward the bracket floor. The bracket includes a voltage divider extending vertically below the conductor compartment floor and parallel to the housing divider. The voltage divider abuts a side of the housing divider.

According to another aspect described herein, there is disclosed an outlet box assembly for mixed voltage capacity conductors. The assembly including a bracket for receiving conductors and a housing for holding the bracket at least partially therein. The bracket includes a conductor mounting portion, wherein the bracket includes conductor compartments for receiving conductors separated by at least one conductor partition extending across an interior space of the bracket. A housing holds the bracket at least partially therein. The housing includes a housing divider extending from one side of the housing to an opposed side, whereby an inner space of the housing is separated by the housing divider. The housing divider extends substantially perpendicular to at least one conductor partition.

According to other aspects described herein, the housing divider does not separate the housing inner space equally. The housing divider includes at least one leg portion extending along an inner surface of an outer wall of the housing wherein the divider leg follows a contour of the housing inner surface.

These and other objectives, features, and advantages of this invention will become apparent from the following detailed description of illustrative embodiments thereof, which is to be read in connection with the accompanying drawings.

DETAILED DESCRIPTION

Figure 1:
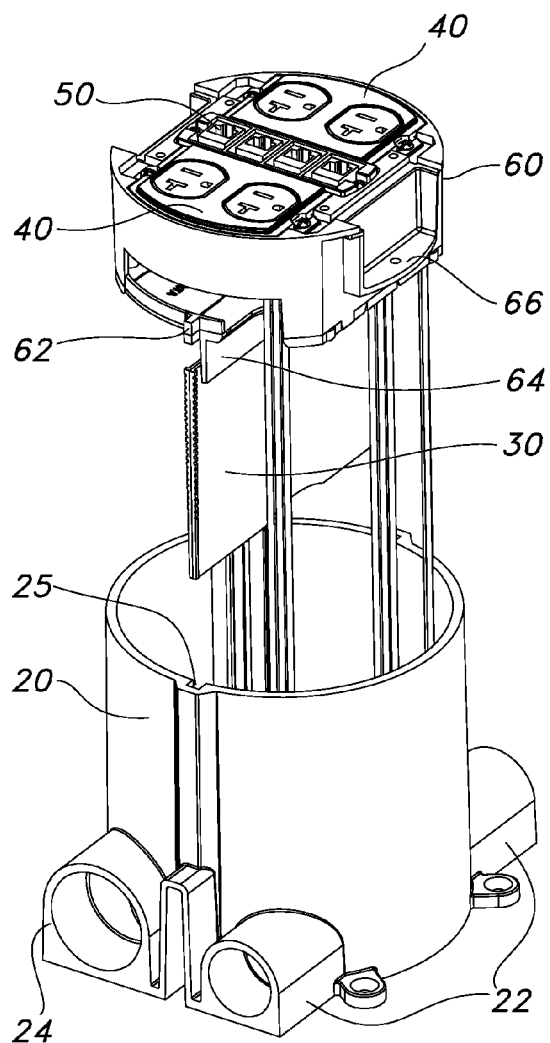
FIG. 1 is a top isometric exploded view of an electrical floor box assembly in accordance with aspects of the disclosed technologies.

Describing now in further detail these exemplary embodiments with reference to the Figures. Described herein is an outlet box assembly for housing, separating and isolating higher voltage power conductors from lower voltage data conductors. Such conductors include electrical and/or data wires, as well as electrical and/or data receptacles wherein the higher voltage refers to the electrical conductors and lower voltage refers to the data conductors.

As used herein, the term "vertical" or "vertically extending" refers generally to the configuration shown in the drawings herein. Thus, either direction above or below a plane generally perpendicular to the floor in which the floor box is installed. More particularly, vertical or vertically extending refer to directions extending parallel to a longitudinal centerline of the cylindrical housing shown and described herein.

As used herein, the term "housing" refers to a structure that supports and encloses one or more subassemblies. Also, as used herein, the term "housing divider" refers to a structure that divides an internal chamber of the housing into parts or portions.

As used herein, the term "bracket" refers to a support structure and/or bracing structure for coupling at least one element to another element related to the overall assembly.

As used herein, the terms "power conductors" refers to elements capable of conducting electricity particularly to convey and/or supply power. Such power conductors include wires, receptacles, controls and connectors that conduct electricity. Similarly, the term "data conductors" refers to elements capable of conducting electricity, preferably at a relatively lower voltage than the power conductors. The data conductors include wires, receptacles, controls and connectors that conduct such lower voltage electricity and are generally used to convey information (data). Further, a higher voltage receptacle refers generally to an electrical outlet including a socket for receiving and mating with a power plug and wires. A lower voltage receptacle refers to a data jack including a socket for receiving and mating with a data plug and wires. As further used herein, the term "conductors" without reference to being either a "power" or "data" conductor includes either or both power conductors and data conductors.

The disclosed technologies include a floor box that incorporates a partitioned receptacle bracket forming compartments (also referred to as gangs) that can be selectively routed to either higher voltage power conductors or lower voltage data conductors within the electrical floor box. In this way, the floor box is divided with a removable divider that maintains a separation of lower versus higher voltages. It should be understood that the floor box as shown in the drawings and described more fully herein is generally shown containing data and power receptacles, however, other electrical devices can also be installed such as switches or dimmers, that operate in conjunction with the high and/or low voltage conducted to the floor box.

Figure 2:
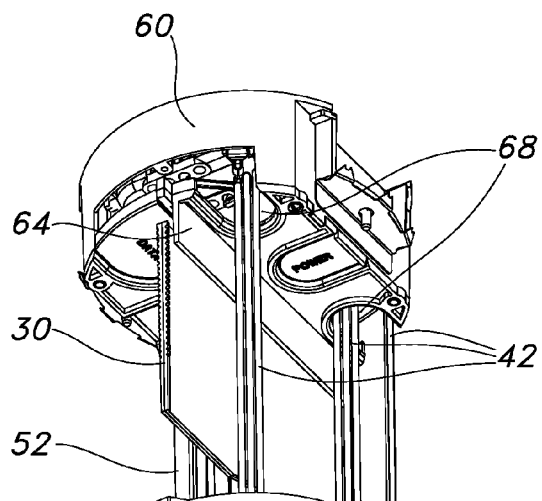
FIG. 2 is a bottom isometric exploded view of an electrical floor box assembly in accordance with aspects of the disclosed technologies.
Figure 2:
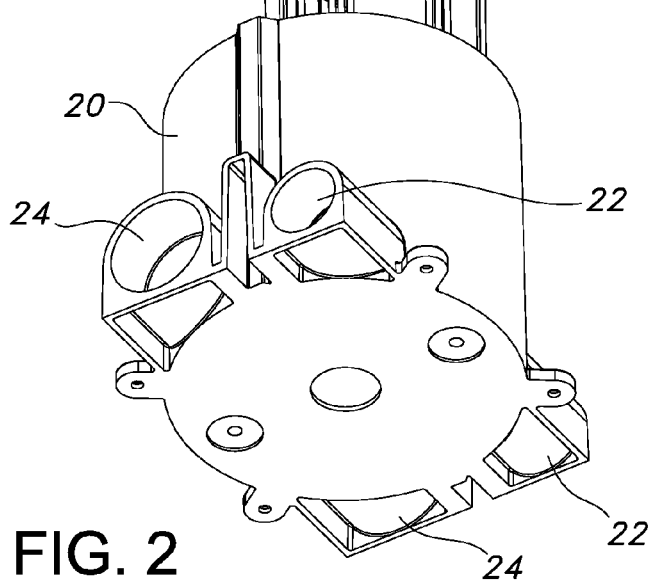

FIGS. 1 and 2 show isometric exploded views of an embodiment of an electrical floor box assembly in accordance with aspects of the disclosed technologies. The floor box 20 (also referred to herein as a "housing") includes various hubs 22, 24 for data and power conductors. In particular, a pair of larger data hubs 24 are provided. Similarly, a pair of power hubs 22 are provided in the base of the housing. These hubs are generally formed to receive a conduit through which is passed data and/or power wires respectively. The housing 20 is a container with the hubs 22, 24 integrally formed into the base. In one embodiment, the housing 20 is formed as a circular container and made of a polymer material, such as PVC or other durable insulating polymers or polymer blends, but it should be understood that other shapes and materials can be used to suit the desired application. The hubs 22, 24 generally form an aperture into the base such that cables and/or wires can pass through the apertures and into the base. As shown, each of the power hubs 22 and data hubs 24 include a pair of opposed hubs such that the wires can traverse straight across the lower section of the floor box 20, although the hubs 22, 24 need not be paired or linearly aligned. However, it should be understood that alternatively the hubs 22, 24 can be formed with other cross-sectional shapes and/or even a knockout configuration such that the hub is generally sealed unless a sealing knockout formed therein is removed.

Figure 7:
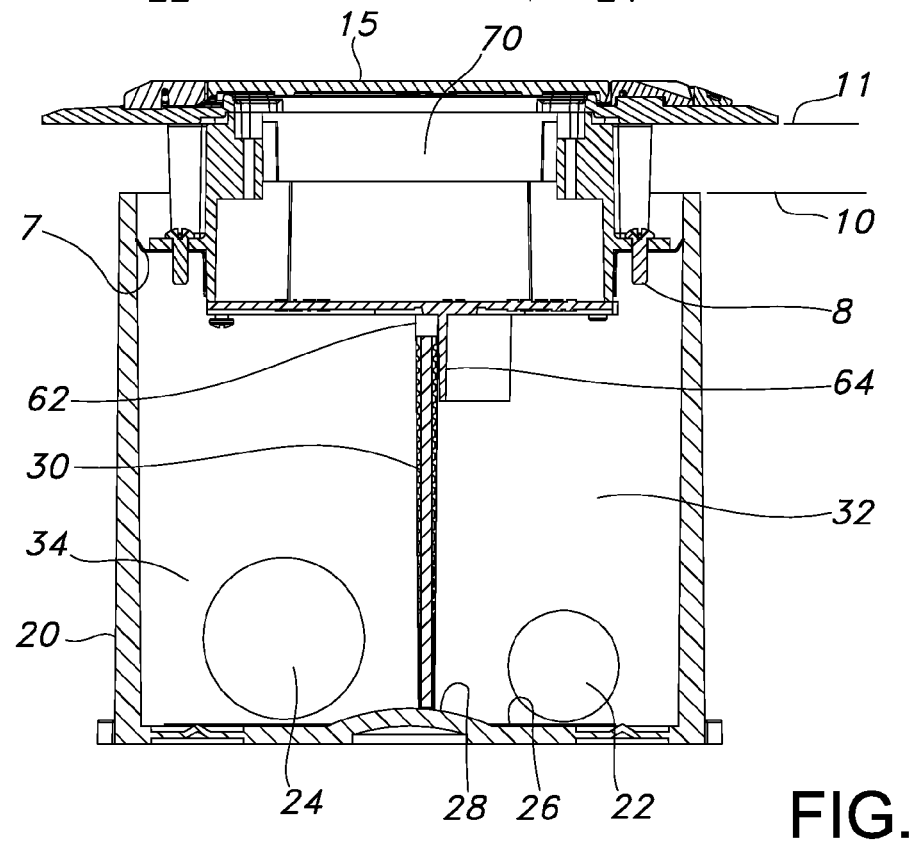
FIG. 7 is a side cut-away view of an electrical floor box assembly with a cover plate, but without electrical fixtures or wiring, in accordance with aspects of the disclosed technologies.

The housing 20 also includes on opposed sides a vertical slot 25 for receiving a housing divider 30. The housing divider 30 can be made from plastic, metal or any suitable material. In at least one embodiment, the housing 20 is formed from the same material as receptacle bracket 60 described further below. The vertical slots while formed on opposed sides of the housing 20 generally includes a channel that extends from an upper vertical edge of the housing 20 down to a floor of the housing 20. Thus, the slot 25 should receive therein a vertically extending edge of the divider 30 for securing it within the housing 20. While divider 30 is shown as a continuous planar web, it should be understood that it could be varied to either include apertures or be formed as a mesh web. Also, divider 30 need not be planar, as described more fully below with regard to other aspects of the invention. FIG. 7 illustrates how the housing divider 30 separates the interior space of housing 20, thereby forming and separating power compartment 32 from data compartment 34. Also the data hub is shown providing an aperture into the data compartment side. Similarly the power hub 22 is shown providing access to the power compartment side 32.

Figure 8:
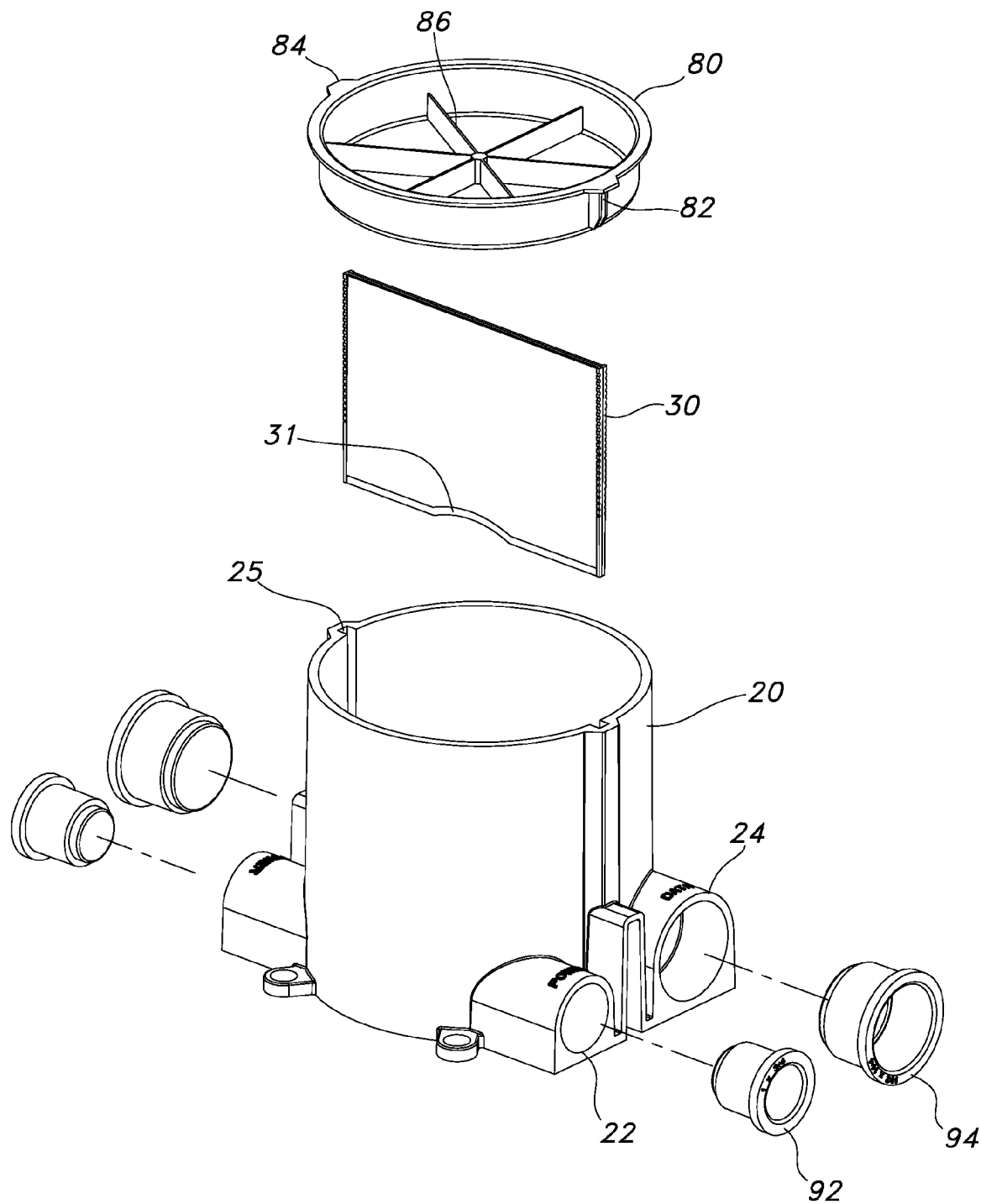
FIG. 8 is a top isometric exploded view of an electrical floor box housing, divider plate, installation plugs and an installation cap in accordance with aspects of the disclosed technologies.

The housing divider 30 can abut the housing floor 26. In particular, the housing floor 26 can be provided with an internally protruding dome or dimple 28 having a circular profile from a top view such that the lower edge of the housing divider 30 will abut an upper surface of the dimple 28 or this lower edge may be partially concave so as to accommodate dimple 28. FIG. 8 illustrates an embodiment including a housing dividing 30 having a mating concave portion 31 sized to match dimple 28. It should be understood, however, that the dimple 28 need not be provided such that an embodiment with a straight lower edge of the housing divider 30 would rest across the entire housing floor 26. As a further alternative embodiment, the dimple 28 could be formed as a depression or recess in the floor 26.

Figure 6:
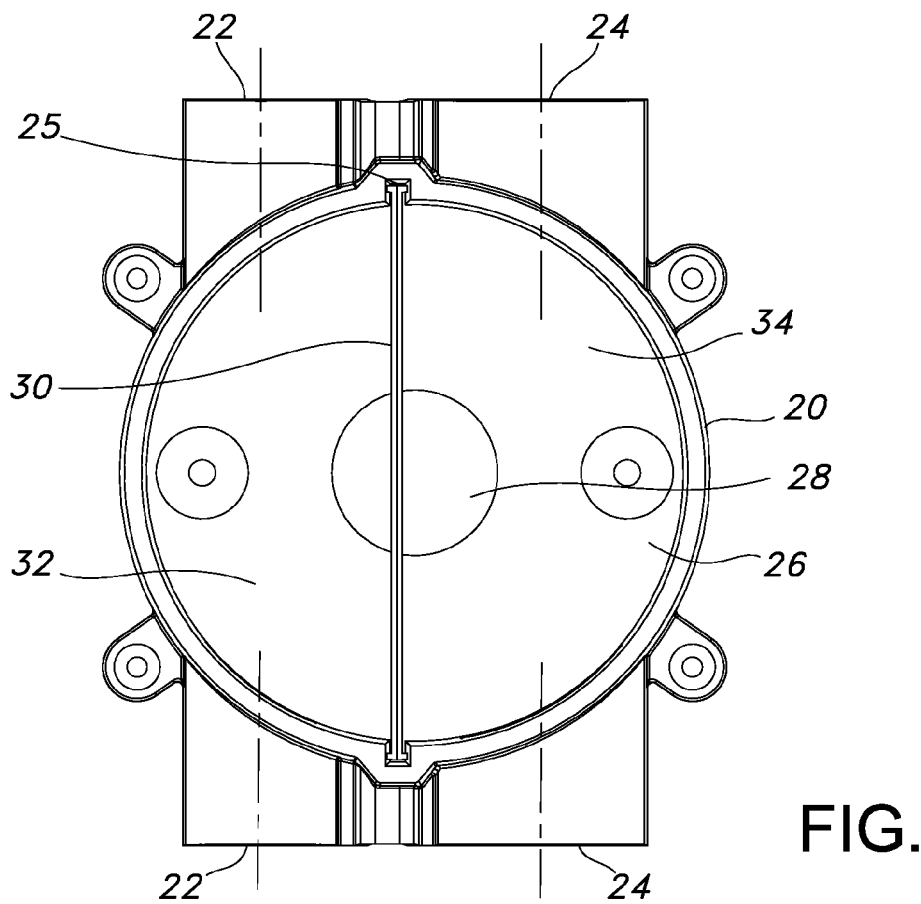
FIG. 6 is a top view of an electrical floor box housing, in isolation, with a divider in accordance with aspects of the disclosed technologies.

Also, as shown in FIGS. 6 and 7, the housing divider 30 can substantially divide the housing 20 in half. It should be noted, however, that the housing divider 30 in the embodiment shown does not divide the housing into precise equal halves, but rather is proportioned to the sizes of the power hub 22 and the data hub 24. As yet a further alternative, additional vertical housing slot 25 could be provided in the housing to provide alternative configurations and/or divisions of the housing 20. In such an alternative configuration, potentially more than one housing divider 30 could be installed in the assembly. Alternatively, with additional slots 25 the housing divider 30 could be installed in a rotated position, such that when viewed from the top, as shown in FIG. 6, the divider 30 would be rotated at an angle or even positioned horizontally relative to that view.

Additionally shown in FIGS. 1 and 2 are the power and data conductors used in conjunction with the outlet box assembly of the disclosed technology. In particular, the power and ground conductor wires 42 extending from the housing 20 up to the receptacle bracket 60, where they are each coupled with a power receptacle 40. The power receptacles 40 can be standard duplex power receptacles which could include a GFCI profile. Also shown are the low voltage data wires 52 extending from the housing 20 up to the receptacle bracket 60 where they are coupled to a data receptacle 50. In the embodiment shown, the receptacle bracket 60 holds one or more individual data jacks. Such data jacks can be made by a variety of manufacturers. It should be noted that the data receptacle 50 as shown is narrower than a standard device, however, receptacle bracket 60 could be designed to have a central compartment such that equally sized receptacles can be configured within the bracket 60.

Figure 3:
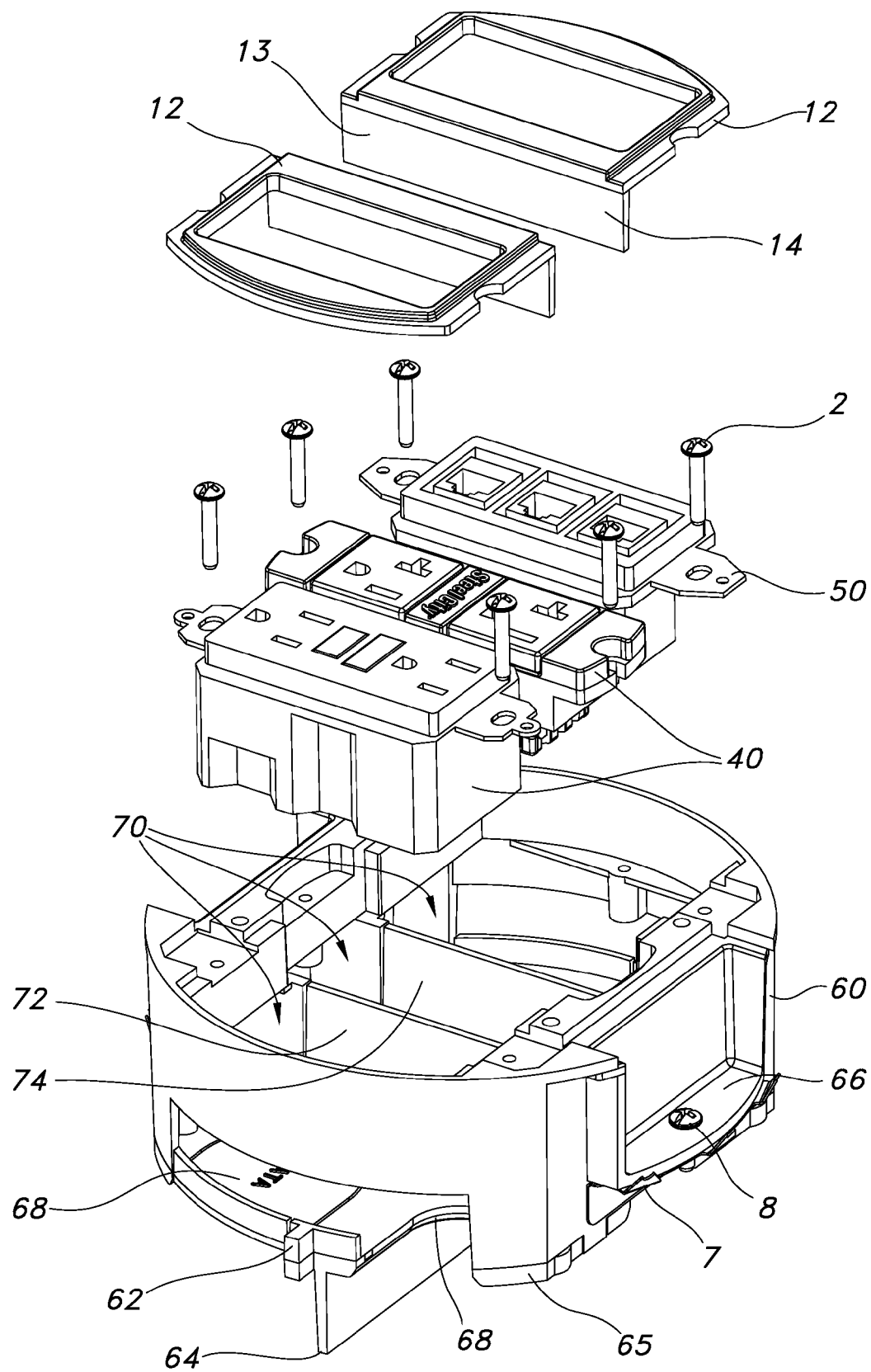
FIG. 3 is top isometric exploded view of an upper portion of the assembly of FIG. 1 with receptacle plates and installation barbs added and one conductor compartment knock-out removed, in accordance with aspects of the disclosed technologies.

The embodiment of FIG. 3 shows a top isometric view of a receptacle bracket 60 with related assembly elements in an exploded view vertically disposed above the receptacle bracket. In particular, shown above the receptacle bracket 60 are two different power receptacles 40 and a data receptacle 50. It should be noted that the power receptacles 40 and data receptacles 50 are configured differently than that shown in FIG. 1 and described above. The interchangeability of the position of such receptacles is an aspect of the disclosed technologies. Also in this embodiment, the center power receptacle 40 is shown to have a more narrow profile than a standard receptacle device. Each of the power receptacles 40 and data receptacles 50 are secured to the receptacle bracket 60 through fastening screws 2. Additionally shown are two receptacle plates 12 exploded above the data and power receptacles 40, 50. The receptacle plates 12 include a plate dividing wall 13 that extends vertically down from the receptacle plate towards a lower part of the assembly, particularly towards the lower floor of the bracket 60. When assembled, the receptacle plates 12 fit over the two outer data and/or power receptacles 40, 50 with the plate dividing walls 13 inserted there between. In this way, the plate dividing walls 13 separate two adjacent receptacles 40, 50. Additionally, each of the divider plates 12 is provided with an inwardly facing overhanging edge 14, which abut partitions 72, 74 of bracket 60. In this way, once placed in the assembly, these inner edges help maintain electrical isolation between the various compartments 70. In the embodiment shown, the receptacle plates 12 do not include any fasteners or snaps holding them in place, but rather are dropped in over and between the receptacles and held there by being sandwiched between the receptacles 40, 50 and the cover (not shown). Alternatively, snaps or fasteners could be provided. Also, the fastener 2 used for holding the receptacles could alternatively be used to hold down the receptacle plates 12.

Figure 4:
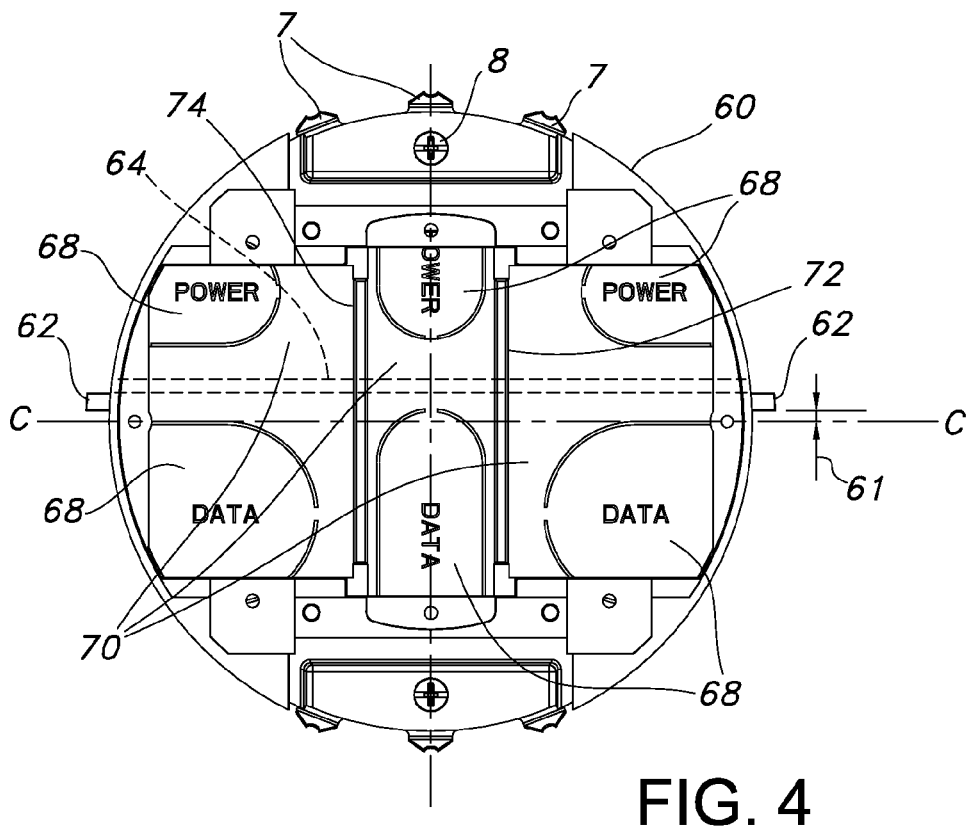
FIG. 4 is a top view of a receptacle bracket, in isolation, with installation barbs in accordance with aspects of the disclosed technologies.

As shown in FIG. 3, the receptacle bracket 60 includes conductor compartments 70 that are formed within the interior space of receptacle bracket 60. Compartment partitions 72, 74 are provided separating an interior space of the receptacle bracket thereby forming the conductor compartments 70. The partitions 72, 74 form a barrier or wall between each gang of receptacles. As shown in FIG. 4, the compartment partitions 72, 74 extend across an interior space of the receptacle bracket 60 substantially perpendicular to the center line C of the bracket. It should be noted that the center line C preferably extends parallel to housing divider 30, shown in FIGS. 1 and 2. In this way, each of the compartments 70 extends across the floor box divider 30 and over both divided compartments 32, 34 of the housing 20. The receptacle bracket 60 can be made of various materials such as stainless steel, die cast zinc, aluminum or plastic as desired.

Figure 5:
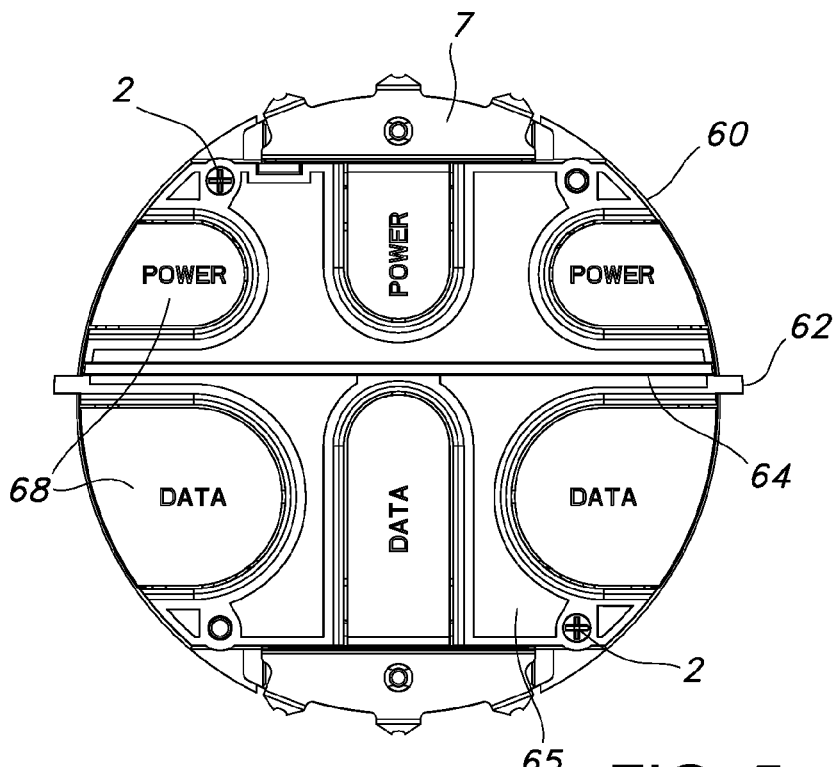
FIG. 5 is a bottom view of a receptacle bracket, in isolation, with installation barbs in accordance with aspects of the disclosed technologies.

Additionally, the receptacle bracket 60 is formed with a floor plate 65 that is secured to the lower portion thereof and separates the compartments 70 from power compartment 32 and data compartment 34 of the housing 20 below. The floor plate 65 can be secured to the receptacle bracket 60 through fasteners 2, as shown in FIG. 5. Alternatively, the floor plate 65 could be integrally formed with the receptacle bracket 60. Also, the floor plate 65 includes knockouts 68. FIGS. 1 and 3 show one of the knockouts 68 removed whereby an aperture is formed between the conductor compartment 70 and a portion of the interior space in the housing 20. Thus, the knockouts 68 selectively provide apertures in the floor plate 65 allowing communication of wires and connections from one of the compartments 32, 34 below the receptacle bracket 60 to the conductor compartments 70. Preferably each compartment 70 includes at least two knockouts 68. In this way, by selectively removing one of the two knockouts 68, access can be provided to a selected compartment 70 from either the power compartment 32 or data compartment 34. In the embodiments shown, the knockouts 68 are disposed at opposed ends of each compartment 70 in order to avoid proximity with the housing divider 30 and the potential interaction of voltages in the region near the housing divider 30. However, they can alternatively be spaces away from the outer periphery of the bracket 60. Also, it should be understood that the size and shape of the knockouts 68 can be modified as desired when designing and forming the floor plate 65.

Further, the receptacle bracket 60, and more particularly the floor plate 65 can include an alignment tab 62. The embodiment shown in FIG. 4 includes two alignment tabs 62 formed on opposed sides of the receptacle bracket 60. Alternatively, only one tab 62 need be provided, to key the position of the bracket 60 within the housing 20. As shown, the alignment tabs 62 are spaced away from center line C by an offset 61. In this way, the alignment tabs are disposed in a configuration parallel to the center line and aligned directly above the housing divider 30. Accordingly, once the housing divider 30 is installed in the vertical slots 25, the receptacle bracket 60 is installed above it with alignment tabs 62 also inserted within the vertical slots 25. Thus, alignment tabs 62 are formed to be inserted and slipped into the vertical slot 25 in order to key or hold the receptacle bracket rotationally in a proper configuration relative to the divided sections of high and low voltage of the housing 20.

Additionally, as shown in the embodiment of FIG. 3, the receptacle bracket 60 can also include a bracket voltage divider 64 vertically extending from the lower floor 65 of the receptacle bracket 60. The bracket voltage divider 64 can be formed by an attachable yet separate plate that is secured, in addition to floor plate 65, to the lower portion of receptacle bracket 60. Alternatively, the bracket voltage divider 64 could be integrally formed with floor plate 65. Also as yet a further alternative, the combination of the bracket voltage divider 65 and floor plate 65 could be integrally formed on the lower portion of receptacle bracket 60. As yet a further alternative embodiment, the floor plate 65 could be integrally formed with receptacle bracket 60 without the bracket voltage divider 64 which is thereafter added and securely fastened prior to insulation.

As shown in the embodiment of FIG. 4, the bracket voltage divider 64 also extends parallel to center line C, but is disposed slightly more offset from central line C than alignment tab 62 and housing divider 30. In this way, the bracket voltage divider 64, when installed, abuts up against a side face of an upper portion of the housing divider 30 as shown in FIG. 7. In the embodiment shown, the bracket voltage divider preferably extends vertically below the receptacle bracket 60. While this embodiment includes the bracket voltage divider as a solid web or wall extending across the entire interior space of the housing, it should be understood that alternatively the bracket voltage divider could be formed as one or more tabs extending vertically downwardly but not across the entire diameter of the housing 20. As yet a further alternative, two such bracket voltage dividers 64 could be provided, forming a channel to receive an upper edge of housing divider 30. Thus, the two such bracket voltage dividers 64 would be disposed on flanking sides of the alignment tabs 62 and extending parallel to one another.

The receptacle bracket 60 can also include a barb flange 66 as more particularly shown in FIG. 3. The barb flange 66 is intended to receive a barb 7 that is fastened to the receptacle bracket 60 by barb fastener 8. The barbs 7, as shown in FIG. 7, can be made of spring steel and preferably grip the inner walls of housing 20 and help stabilize and secure the overall receptacle bracket 60 and outlet box cover 15. Also, an installation using such barbs 7 allows for some variation of floor thickness in an installation. The space between the top of the concrete subfloor 10 and the finished floor 11 above can vary. Thus, installation using barbs 7 will allow these variations in floor thickness to be accommodated by allowing the installer to seat the entire assembly to a desired depth, with the barbs 7 holding it in the desired position. The barbs 7 act as a one way installation device. In other words, once the bracket 60 with barbs 7 mounted thereon is inserted into the housing 20, it is not usually removed without removing the barb fasteners 8 which are holding the barbs thereon. Additionally, it should be noted that the receptacle bracket 60 includes a recess or an indented region allowing access to the barb fastener 8 from above. This allows a screwdriver or tool to access the barb fastener 8 for removal subsequent to installation. Because barb fasteners 8 permit removal of barb 7, bracket 60 can be adjusted or even removed from housing 40 after insulation if such is desired. This differs from those designed that only permit insertion but removal thereafter is problematic, difficult or even impossible. As more clearly shown in FIG. 4, the barb 7 includes several elements that protrude radially beyond an outer circumference of the receptacle bracket 60 for engaging the inner sidewalls of the housing 20.

FIG. 8 shows another aspect of the disclosed technologies. In particular, FIG. 8 shows an exploded view of a housing 20 with a housing divider 30, an installation cap 80, power hub plugs 92 and data hub plugs 94. Installation cap 80 can be used during the actual installation of the housing 20 in a concrete subfloor. Such a cap 80 can be useful in preventing debris or non-hardened concrete from entering the interior of the housing 20, and particularly the vertical slots 25. Preferably, the installation cap 80 includes mating tabs 82, which are sized to fit in slots 25. Also, the cap 80 can be provided with one or more flanges 84, that are useful for removal of the cap 80 from the housing 20. Additionally, spokes 86 provided added reinforcement for the cap 80. It should be understood that the cap 80 is preferably formed with a solid bottom plate, so that debris or wet concrete can not pass between spokes 86. Similar to the function of the cap 80, the power hub plug 92 will cover power hub 22 and the data hub plug 94 will cover the data hub 24.

Figure 9:
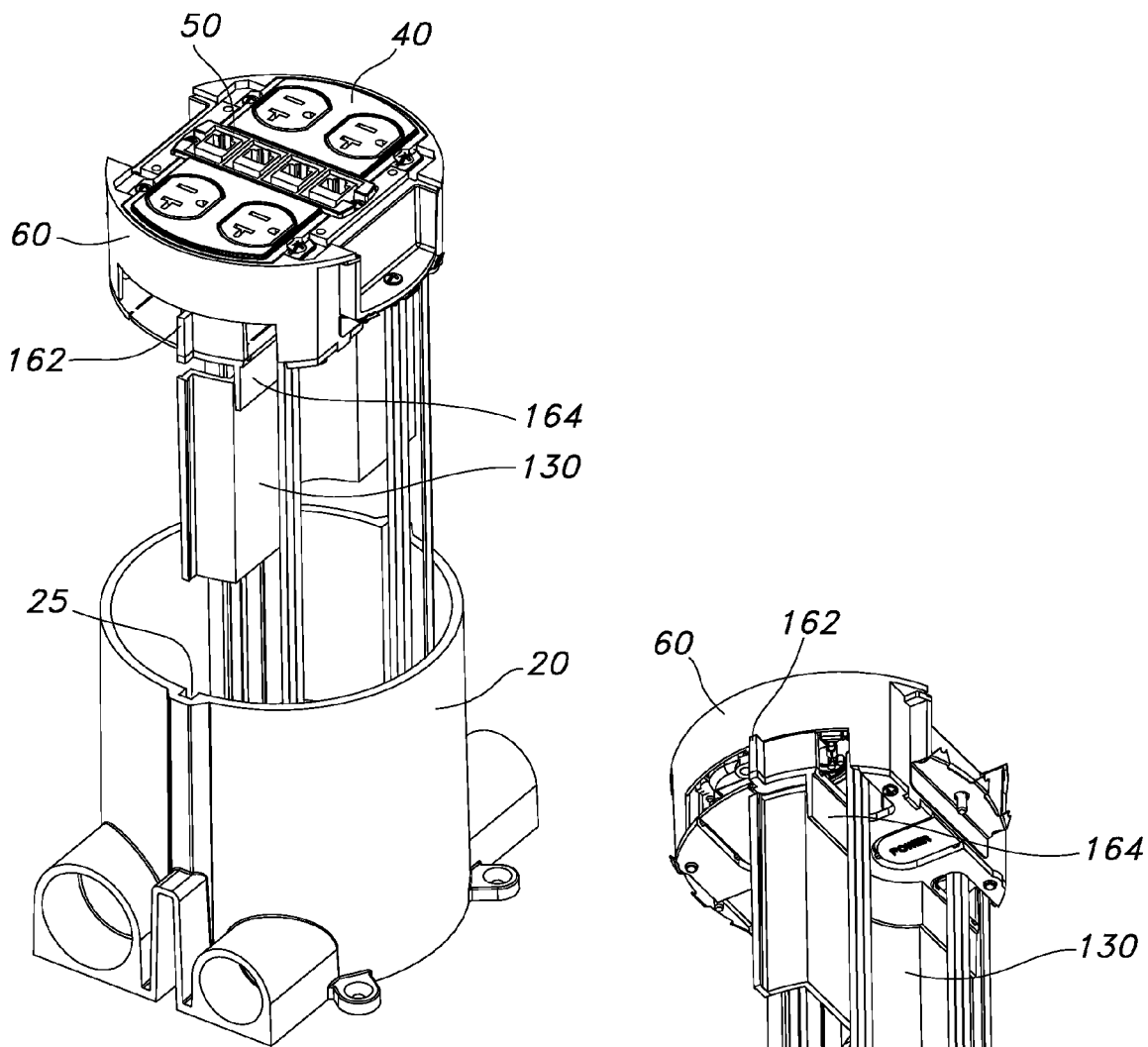
FIG. 9 is a top isometric exploded view of an electrical floor box assembly in accordance with other aspects of the disclosed technologies.
Figure 10:
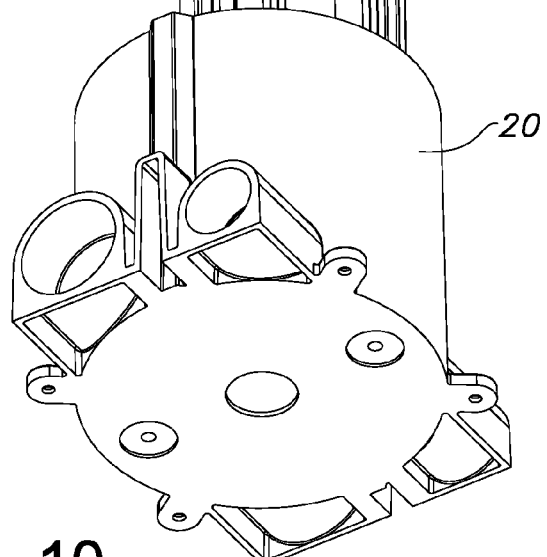
FIG. 10 is a bottom isometric exploded view of an electrical floor box assembly in accordance with other aspects of the disclosed technologies.
Figure 11:
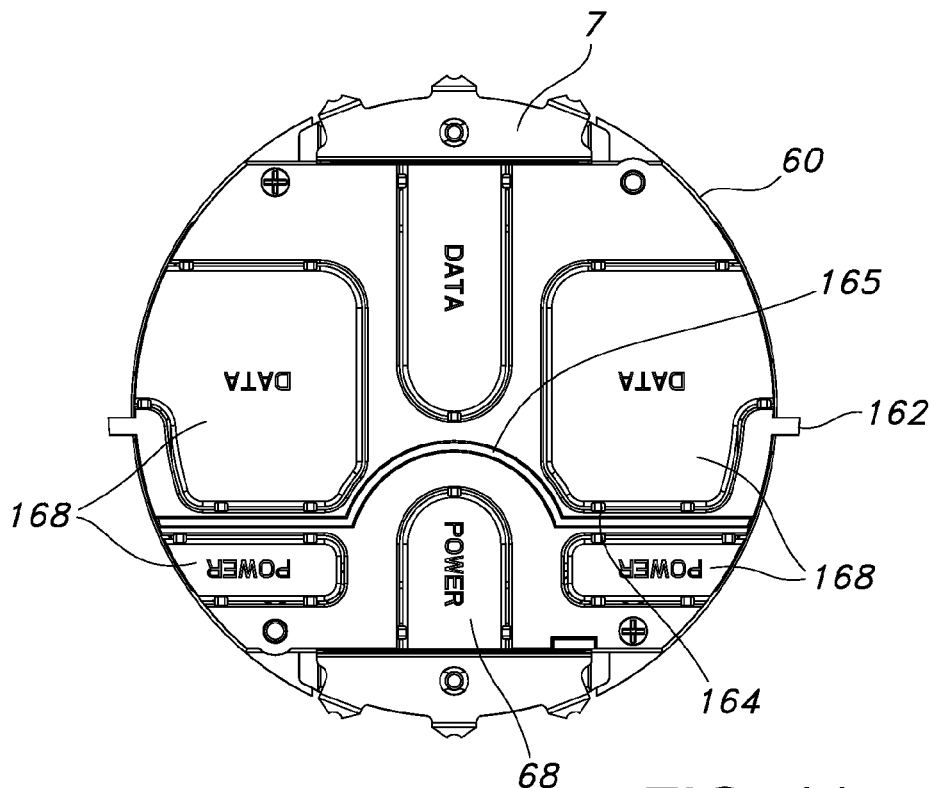
FIG. 11 is a bottom view of an alternative receptacle bracket, in isolation, with installation barbs in accordance with aspects of the disclosed technologies.
Figure 12:
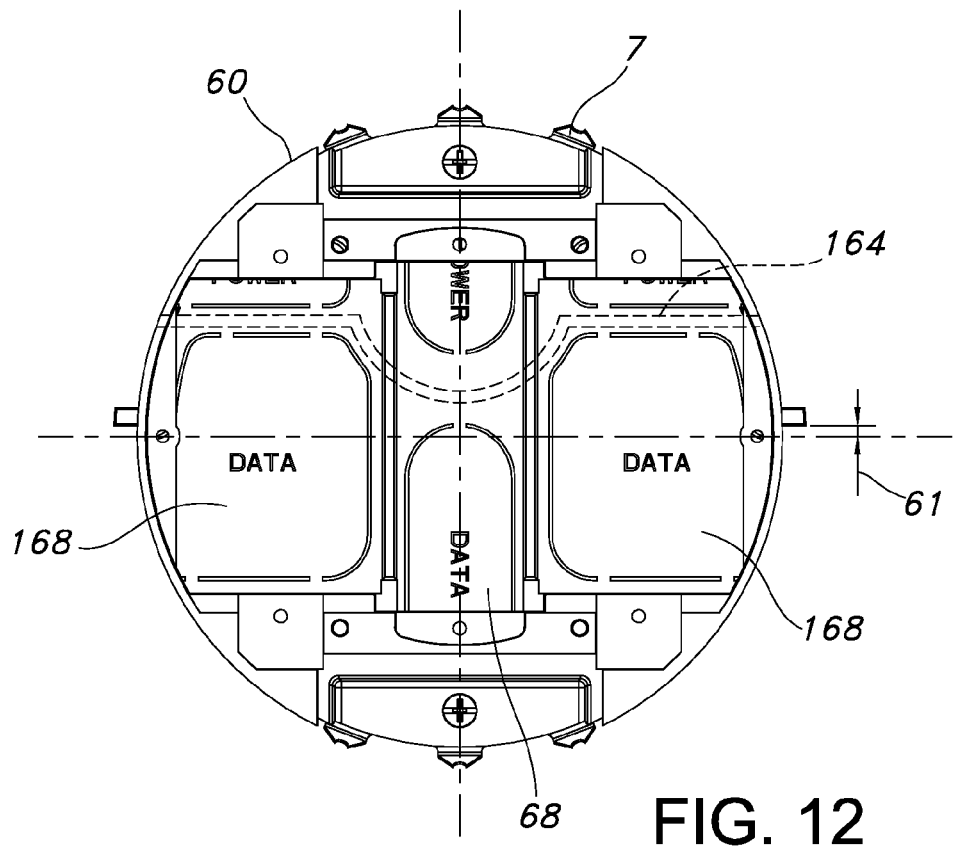
FIG. 12 is a top view of an alternative receptacle bracket, in isolation, with installation barbs in accordance with aspects of the disclosed technologies.
Figure 13:
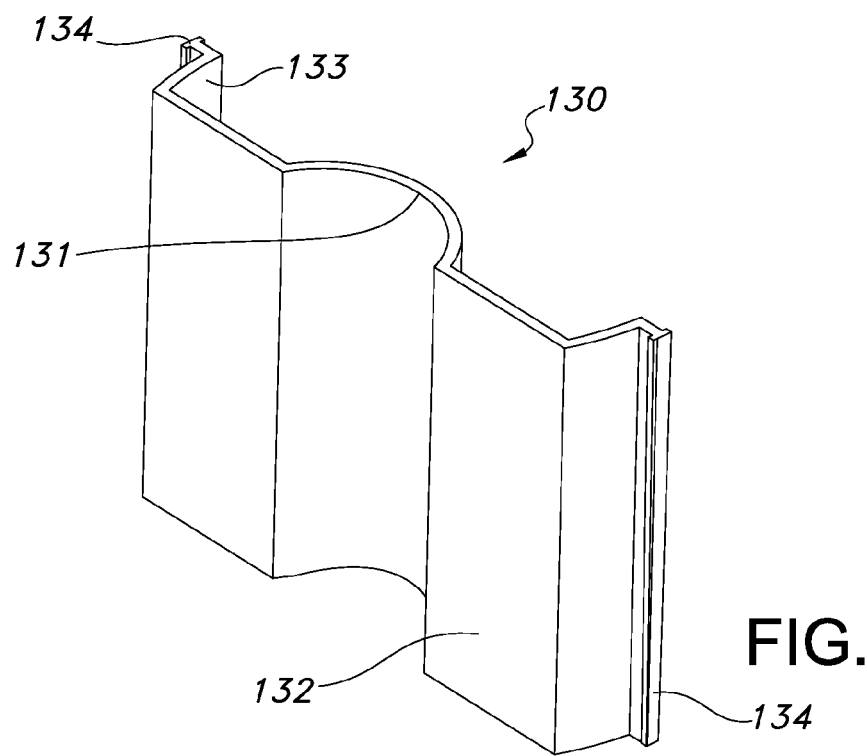
FIG. 13 is a top isometric view of an alternative divider, in isolation, in accordance with aspects of the disclosed technologies.
Figure 14:
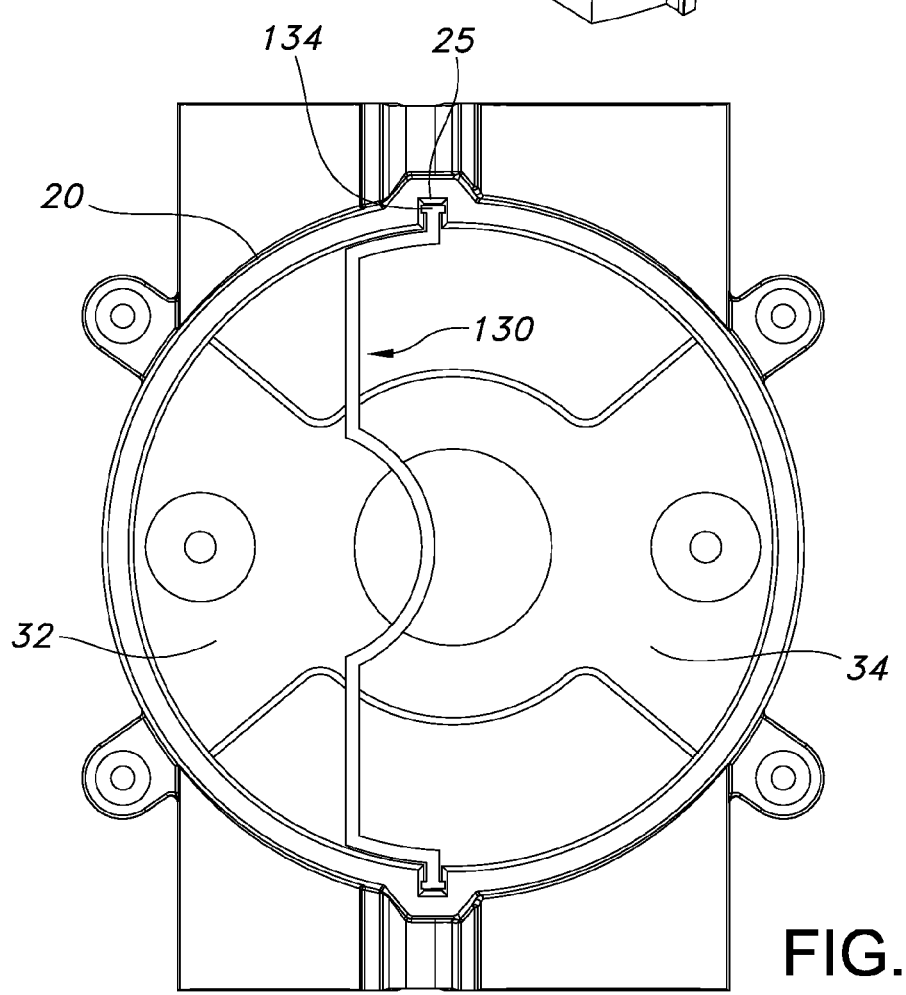
FIG. 14 is a top view of an electrical floor box housing, in isolation, with an alternative divider in accordance with aspects of the disclosed technologies.

FIGS. 9-14 show an alternative embodiment housing divider 130. FIGS. 9 and 10 show isometric exploded views of another embodiment of an electrical floor box assembly in accordance with aspects of the disclosed technologies. In particular, the divider 130 and the floor of bracket 60, including bracket voltage divider 164, are formed with a distinct profile in order to provide greater room for data cables and data connectors within the divided housing 20. Additionally, the knock-outs in bracket 60 can be made larger and/or smaller accordingly. FIG. 13 shows the divider 130 by itself, while FIG. 14 shows the divider 130 in an empty housing 20 from a top view. The divider 130 includes slot inserts 134 that are preferably formed to seat within slots 25 of the housing 20. Then in order to provide a division for the housing 20 that is an alternative to extending directly across the opposed slots 25, the divider 130 includes legs 133 that extend along the inner circumference of the housing 20. It should be understood that although legs 133 are shown with a curvature that matches the curve of the inner walls of housing 20, the legs 133 could be straight. The divider 130 then includes two straight divider portions 132 joined in the middle by a bulging portion 131. It should be understood that while a particular profile for divider 130 is shown, variations in the shape of the dividers 30, 130 would be understood to those of ordinary skill in the art. For example, from a top view such as that shown in FIG. 14, a further alternative divider could have an arch or linear portion extending from slot inserts 134 to a side of the central bulging portion 131.

FIGS. 11 and 12 show an embodiment of the receptacle bracket 60 with an alternative bracket voltage divider 164, which matches the profile of alternative divider 130. In this embodiment, the alignment tabs 162 are spaced further away from the vertically extending bracket voltage divider 164. It should be noted that bracket voltage divider 164 includes a central bulging portion 165, similar to bulging portion 131. Such bulges are useful to make room for the power knock-out 68. This embodiment further illustrates alternative knock-outs 168 for forming appropriately sized apertures on either side of the divider 130.

It will be appreciated that various of the above-disclosed and other features and functions, or alternatives thereof, may be desirably combined into many other different assemblies, systems or applications. Various presently unforeseen or unanticipated alternatives, modifications, variations, or improvements therein may be subsequently made by those skilled in the art which are also intended to be encompassed by the following claims. The claims, as originally presented and as they may be amended, encompass variations, alternatives, modifications, improvements, equivalents, and substantial equivalents of the embodiments and teachings disclosed herein, including other floor box assemblies and those that are presently unforeseen or unappreciated, and that, for example, may arise from applicant/patentee and others.

What is claimed is:

1. An outlet box assembly for separating and insulating higher voltage power conductors from lower voltage data conductors, the assembly comprising:
   a housing including at least one vertically extending peripheral wall surrounding an interior space of the housing;

a divider disposed within the housing, the divider forming a vertical wall extending across the interior space separating a first housing compartment and a second housing compartment, the housing including at least one vertical slot, an edge of the divider being seated within the slot; and a bracket for securing at least one of the higher voltage power conductors and at least one of the low voltage data conductors, the bracket including at least one partition separating conductor compartments therein, the at least one partition extending vertically and substantially perpendicular to the divider, the bracket including a floor plate extending across at least a portion of both the first housing compartment and the second housing compartment, the bracket including an alignment tab disposed in the slot.

2. The assembly of claim 1, wherein the bracket is substantially disposed vertically above the divider.

3. The assembly of claim 1, wherein the floor plate includes a plurality of knock-outs a first one of the conductor compartments having at least one knock-out disposed over the first housing compartment and at least one other knock-out disposed over the second housing compartment.

4. The assembly of claim 3, wherein a second one of the conductor compartments includes additional ones of the plurality of knock-outs.

5. The assembly of claim 1, further comprising:
a receptacle plate covering at least one portion of at least one receptacle, the receptacle plate securing the receptacle between the receptacle plate and the bracket.

6. The assembly of claim 5, wherein the receptacle plate includes a dividing wall extending from the receptacle plate toward the floor plate.

7. The assembly of claim 1, wherein the bracket includes a voltage divider extending vertically below the floor plate and parallel to the divider.

8. The assembly of claim 7, wherein the voltage divider abuts a side of the divider.

9. The assembly of claim 1, wherein the divider forms a planar web extending substantially across the entire interior space.

10. An outlet box assembly for mixed voltage capacity conductors, the assembly comprising:
a bracket for receiving conductors, the bracket including a conductor mounting portion, wherein the bracket includes conductor compartments for receiving the conductors, the conductor compartments separated from each other by at least one conductor partition extending across an interior space of the bracket; and a housing holding the bracket at least partially therein, the housing including a divider disposed therein, the divider forming a vertical wall extending from one side of the housing to an opposed side, an inner space of the housing being separated by the divider, the divider extending substantially perpendicular to the at least one conductor partition, the housing including at least one vertical slot, an edge of the divider being seated within the slot, the bracket including an alignment tab disposed in the slot.

11. The assembly of claim 10, wherein the bracket is substantially disposed vertically above the divider.

12. The assembly of claim 10, wherein a first one of the conductor compartments includes a plurality of knock-outs, wherein one of the plurality of knock-outs is disposed over a first portion of the housing inner space and another one of the plurality of knock-outs is disposed over a second portion of the housing inner space, the first and second portions of the housing inner space disposed on opposite sides of the divider.

13. The assembly of claim 12, wherein a second one of the conductor compartments includes more than one of the plurality of knock-outs.

14. The assembly of claim 10, wherein the divider does not separate the housing inner space equally.

15. The assembly of claim 10, wherein the divider includes at least one leg portion extending along an inner surface of an outer wall of the housing, wherein the divider leg follows a contour of the housing inner surface.

16. The assembly of claim 10, wherein the bracket includes a voltage divider extending vertically below the conductor compartments and parallel to the divider.

\* \* \* \* \*